United States Patent [19]

Kraemer et al.

[11] Patent Number: 5,491,637

[45] Date of Patent: Feb. 13, 1996

[54] METHOD OF CREATING A COMPREHENSIVE MANUFACTURING, SHIPPING AND LOCATION HISTORY FOR PIPE JOINTS

[75] Inventors: Mark S. Kraemer; James A. Ratliff, both of Katy, Tex.

[73] Assignee: Amoco Corporation, Chicago, Ill.

[21] Appl. No.: 215,497

[22] Filed: Mar. 18, 1994

[51] Int. Cl.⁶ .............................. G06F 17/60; F16L 55/00
[52] U.S. Cl. .......................... 364/468; 364/401; 364/478; 138/104; 235/375
[58] Field of Search .................... 364/401, 403, 364/468, 472, 473, 478, 402; 405/154, 157; 138/104; 116/109; 175/40; 235/375, 462, 432, 385, 376; 371/2.2

[56] References Cited

U.S. PATENT DOCUMENTS

| | | |
|---|---|---|
| 3,845,279 | 10/1974 | Rosdorff . |
| 4,340,810 | 7/1982 | Glass . |
| 4,455,483 | 6/1984 | Schonhuber . |
| 4,476,381 | 10/1984 | Rubin . |
| 4,558,318 | 12/1985 | Katz et al. ............................ 235/375 |
| 4,688,244 | 8/1987 | Hannon et al. . |
| 4,701,869 | 10/1987 | Callegari, Sr. et al. . |
| 4,711,994 | 12/1987 | Greenberg . |
| 4,728,784 | 3/1988 | Stewart . |
| 4,736,687 | 4/1988 | Grube et al. . |
| 4,750,197 | 6/1988 | Denekamp et al. . |
| 4,782,221 | 11/1988 | Brass et al. . |
| 4,786,792 | 11/1988 | Pierce et al. . |
| 4,794,239 | 12/1988 | Allais . |
| 4,816,824 | 3/1989 | Katz et al. . |
| 4,920,488 | 4/1990 | Filley ................................... 364/403 |
| 5,017,873 | 5/1991 | Rippingale et al. . |
| 5,035,539 | 7/1991 | Kawafuji et al. ..................... 405/154 |
| 5,038,283 | 8/1991 | Caveney ............................... 364/403 |
| 5,051,034 | 9/1991 | Goodman ............................. 405/157 |
| 5,109,974 | 5/1992 | Hirano et al. . |
| 5,111,605 | 5/1992 | Bossi . |
| 5,142,128 | 8/1992 | Perkin et al. ......................... 235/375 |
| 5,153,842 | 10/1992 | Dlugos, Sr. et al. ................. 364/478 |
| 5,235,167 | 8/1993 | Dvorkis et al. . |
| 5,243,128 | 9/1993 | Marcoz . |
| 5,369,641 | 11/1994 | Dodt et al. ............................ 371/2.2 |

FOREIGN PATENT DOCUMENTS

| | | |
|---|---|---|
| 59-98229 | 6/1984 | Japan . |
| 63-217492 | 9/1988 | Japan . |
| 2-3881 | 1/1990 | Japan . |
| 4-312190 | 11/1992 | Japan . |
| 2208310 | 3/1989 | United Kingdom . |
| WO91/10202 | 7/1991 | WIPO . |

OTHER PUBLICATIONS

*Robotic Materials Handling for Automated Building Costruction Technology*, Automation in Construction, Dec., 1992, Skibniewski and Wooldridge, No. 3, pp. 251–266.

Primary Examiner—Roy N. Envall, Jr.
Assistant Examiner—Steven R. Garland
Attorney, Agent, or Firm—Arnold, White & Durkee

[57] ABSTRACT

A method for creating a historical record of the manufacturing, transportation and location history of steel pipe joints includes predetermined characteristics of the pipe joints. During manufacture, the heat number and coil number of the steel used to make each pipe joint is recorded. Each pipe joint is assigned a unique joint number, which is also recorded. A label containing the heat number, coil number and joint number is created and attached to the corresponding pipe joint. The pipe joints are then transported to a final destination. The exact location of the final destination is compiled into a historical record in which the location of the final destination is associated with the heat number, coil number and joint number for each pipe joint. Finally, the labels are removed from the pipe joints to prevent damage to sensitive components in the completed pipeline.

3 Claims, 11 Drawing Sheets

METHOD OF CREATING A COMPREHENSIVE MANUFACTURING, SHIPPING AND LOCATION HISTORY FOR PIPE JOINTS

FIELD OF THE INVENTION

The present invention relates generally to the fields of manufacturing, handling and installing steel pipe. More particularly, the invention relates to a method of uniquely identifying each section of steel pipe and creating a comprehensive manufacturing, shipping and location history for each section of steel pipe.

BACKGROUND OF THE INVENTION

Steel pipe is typically manufactured at a mill one batch at a time commonly referred to as a heat. A single ladle of molten steel is used to form a slab or billet for a single heat. The slab or billet is then divided into smaller units commonly referred to as coils. Finally, each coil is further divided into several lengths or individual sections of pipe commonly referred to as joints. Therefore, each section of pipe can be uniquely identified by specifying the heat, coil and joint.

After pipe joints are manufactured, they are subjected to various tests prior to shipment. Pipe joints are then shipped to purchasers who receive the pipe and decide whether to accept it. Purchasers sometimes perform additional testing on pipe joints before they are accepted. After pipe joints are accepted, they are either stored for future use or installed directly in a pipeline or well bore. Accurate record keeping at each of these phases in the manufacturing process is essential to be able to accurately identify individual pipe joints for future operations.

In one known method of identifying pipe joints, each pipe joint is stenciled with identification information. This method of identifying pipe joints is subject to significant shortcomings, in some cases, because pipe joints are subjected to other processing that tends to remove stenciled information. Examples of these processes are internal or external coating, hot or cold bending, threading or grit blasting. The coating process typically removes the stencils. After coating, each pipe joint has to be re-stenciled. Thus, the possibility for error because of failure to re-stencil pipe joints with the correct information exists. Stenciled information also has a useful life of about six months. Therefore, stenciled information is not useful for long-term identification of pipe joints. Furthermore, stenciled information cannot be read at all after the pipe joint is deployed in a pipeline and buried or submerged in water.

In another known method of identifying pipe joints, a bar code label that embodies manufacturing information and identification information is disposed inside of each pipe joint. The bar code label remains in the pipe joint throughout its lifetime and is readable from either inside or outside the pipe joint. This method of identifying pipe joints is not effective because the bar code labels cannot be read accurately using existing technology. Scanning devices known in the art as "pigs" are deployed into completed pipelines to read the bar code labels with generally poor results. It is also undesirable in many cases to leave bar code labels inside pipe joints because the inside of the pipe joints must be scraped clean prior to installation. The use of bar coded labels inside pipe joints also leads to the possibility of valve jams and similar problems that occur because the bar code labels tend to loosen and become dislodged over time as fluid flows in the completed pipeline.

Paper records known in the art as tally sheets have been used to keep track of pipe joints at various stages of manufacturing, testing and shipping. Shortcomings in prior art pipe joint identification methods result in problems in maintaining accurate tally sheets. Specifically, prior art methods of identifying pipe joints are cumbersome, inefficient and subject to human error. These potentials for error are compounded by the manual labor intensive nature of creating tally sheets.

Impending Federal Department of Transportation regulations mandate that each section of pipe be uniquely identified and its manufacturing history recorded and saved. By continuing to use the typical manual labor intensive procedures for identifying each section of pipe and recording its history, these regulations will lead to more elaborate but still error-prone record keeping procedures on the part of manufacturers and users of steel pipe.

Another continuing problem in the field has been the difficulty of maintaining accurate testing, transportation and shipping records for pipe joints. This is true because the homogeneous nature of pipe joints makes it difficult to uniquely identify a specific joint. Moreover, steel pipe joints of similar grade have substantially similar characteristics regardless of where or by whom they were manufactured.

The ability to maintain accurate identification information for pipe joints is also desirable because catastrophic failure of pipe joints can result in legal liability for the owner of the pipe. If the pipe owner has evidence identifying the manufacturer of the pipe, the pipe owner has the opportunity to seek legal recourse against that manufacturer to limit his liability. Accurate identification information further allows the pipe owner to inspect pipe joints with similar histories (e.g. pipe joints from the same heat and/or coil) to prevent further catastrophic failures.

A method of creating a comprehensive manufacturing, shipping and location history for pipe joints is desirable. Such a method would result in simplified record keeping procedures and assist users of steel pipe joints in their duty of compliance with new government regulations. A method of creating a comprehensive manufacturing, shipping and location history would also allow substantial time savings in pipe shipping and receiving operations and allow accurate identification of installed pipe joints.

SUMMARY OF THE INVENTION

The present invention is a method of creating an accurate, comprehensive history for each pipe joint manufactured. This history preferably includes a purchase order number, a size, a weight, a grade, an end finish, a wall thickness, a manufacturing specification, an identification of the manufacturer, a date of manufacture, the specific heat number, the coil number and the joint number identifying the steel used to make the pipe joint. Each pipe joint is assigned a unique joint number. The length of the joint is also part of the history.

The method of the present invention employs a hand-held computer with a bar code label printer, a report printer and a bar code scanner. Manufacturing, testing, shipping and receiving data is entered into the hand-held computer by an operator at various stages in the manufacture of the pipe joints. When the pipe joints are shipped from the mill, bar code labels are generated for each pipe joint using the hand-held computer and the bar code label printer. The bar code label, which is preferably affixed to the inside of the associated pipe joint, includes all information from the history previously described for each pipe joint.

To create a shipping history, each bar code label from a pipe joint that is to be shipped is scanned into the hand-held computer using the bar code scanner. The identity of carrier, the mode of transportation and the destination of the shipment are preferably entered into the hand-held computer prior to shipment. The hand-held computer automatically tallies pipe joint information as pipe joints are loaded and informs the user when the carrier has reached its capacity. A bar code shipping label reflecting all historical information about the shipment is generated using the hand-held computer and the bar code label printer. The bar code shipping label typically accompanies the shipping documentation.

When the shipment is received, the receiver scans the bar code shipping label and compares the information contained therein to purchasing records. The historical information stored in the hand-held computer is also used to generate reports, which may be printed with the report printer. When each pipe joint reaches its final destination, its exact location is recorded as part of the historical record and the bar code is removed from the inside of the pipe joint.

The historical record created by the method of the present invention allows the manufacturer of each pipe joint to be easily identified. It also results in the ability to cross reference and identify pipe joints having similar characteristics in the event of a non-conformance during shipment or a catastrophic failure of a pipe joint after installation. Another advantage of the present invention is that the accurate, comprehensive information provided assists end users of pipe joints in receiving governmental and operational permits. The invention further facilitates compliance with the previously mentioned federal regulations. The invention provides information that is useful in performing the functions of inventory management and accounting.

BRIEF DESCRIPTION OF THE DRAWINGS

Other advantages of the invention will become apparent upon reading the following detailed description and upon reference to the accompanying drawings, in which.

Figure 1:
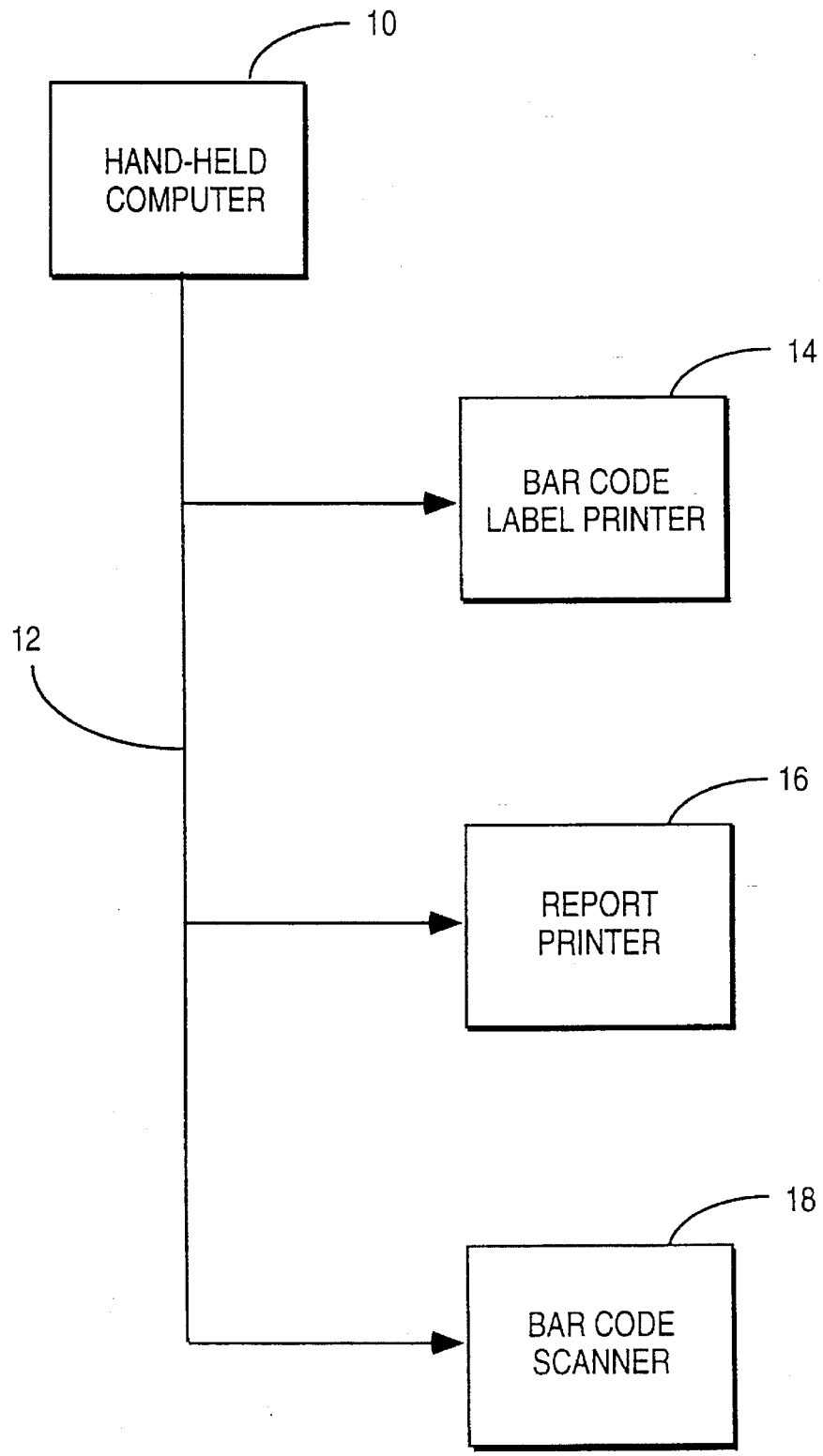
FIG. 1 is a simplified block diagram of a computer system suitable for performing the method of the present invention.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicants' intention is to cover all modifications, equivalents, and alternatives falling within the spirit and scope of the invention as defined by the appended claims.

DETAILED DESCRIPTION OF THE PREFERRED EMBODIMENTS

FIG. 1 is a simplified block diagram of a computer system suitable for performing the method of the present invention. A hand-held computer 10 is connected via a bus 12 to a bar code label printer 14, a report printer 16 and a bar code scanner 18. As will be fully set forth, the hand-held computer 10 is programmed to carry out the method of the present invention. The hand-held computer 10 may be of any conventional architecture and may operate using any conventional operating system. In a preferred embodiment, the hand-held computer 10 operates using the DOS operating system.

The hand-held computer 10 is used to receive and organize all information pertinent to performing the method of the present invention. Information is input into the hand-held computer 10 either manually or via the bar code scanner 18. The information managed by the hand-held computer 10 includes manufacturing data for pipe joints, purchase order data and transportation data. The bar code label printer 14 is used to print individual bar code labels containing manufacturing information for pipe joints. The bar code label printer 14 is also used to print bar code labels containing transportation information and manufacturing and other information for entire shipments of pipe joints.

In a preferred embodiment of the invention, two-dimensional bar codes of the type commonly known in the field are employed because they have the capability of recording sufficiently large quantities of information. It is contemplated, however, that any type of bar coding that allows recording of enough information is suitable for use in the invention.

The report printer 16 is used to print various reports using information stored in the hand-held computer 10. Examples of reports that may be generated from the information stored in the hand-held computer 10 are shipping tally reports, receiving tally ;reports, daily summary reports and receiving summary reports. The contents of these reports is fully explained below.

Figure 2:
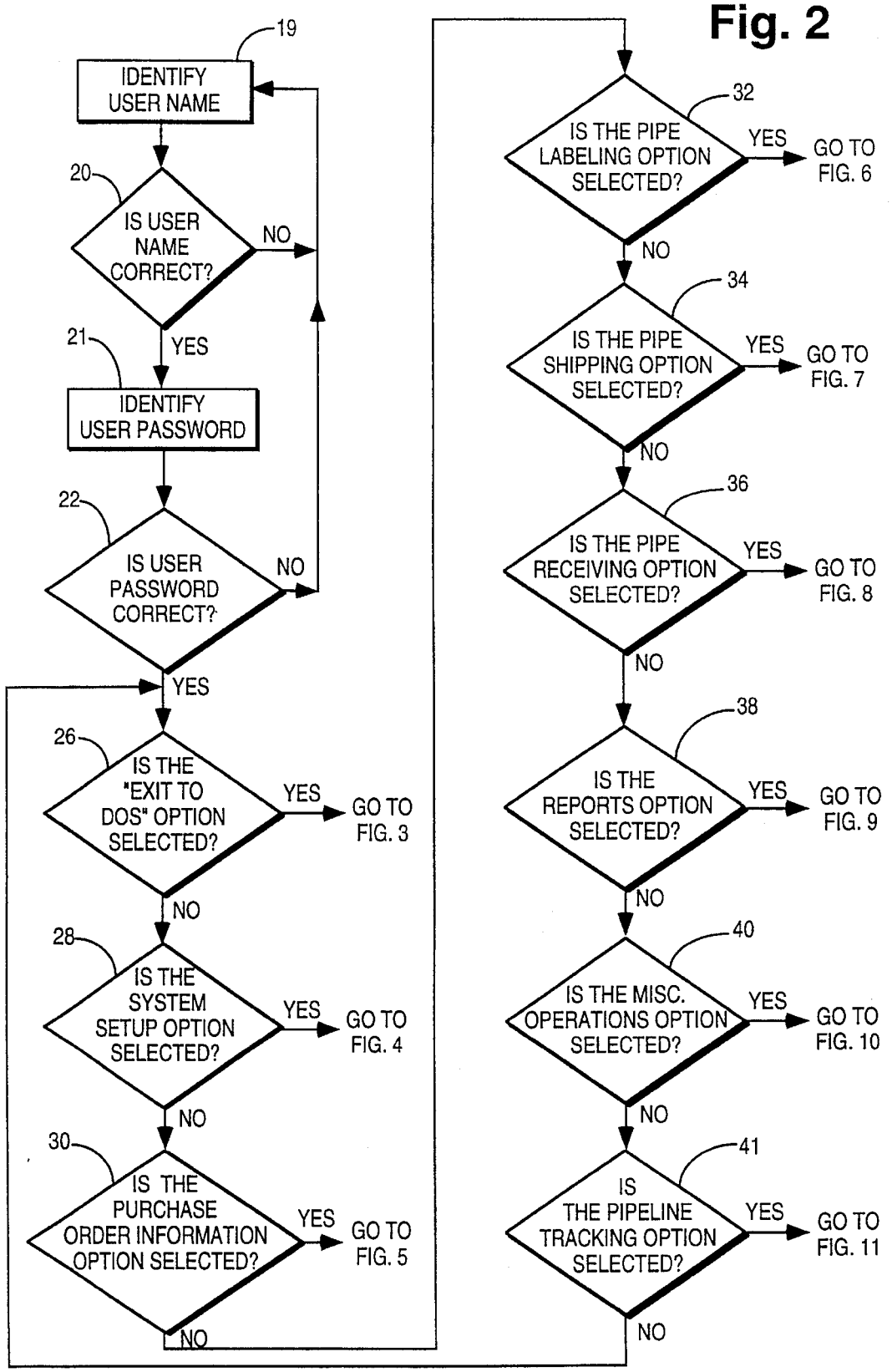
FIG. 2 is a flow diagram of the overall functional hierarchy of a computer program capable of performing the method of the present invention.

FIG. 2 is a flow diagram of the overall functional hierarchy of a computer program capable of performing the method of the present invention. At step 19, a user is asked to identify his unique user name. The user name is verified at step 20. If the user name is not valid, it must be re-entered by the user. At step 21, the user is required to enter a unique password. At step 22, the password is verified. If the password is not correct for the associated user name, the user must re-enter his user name and password. These functions are performed to allow unique identification of system users and to prevent unauthorized access to information stored on the hand-held computer 10. The functions of requiring a user to identify himself via a user name and a password are well-known to those of ordinary skill in the field.

After the entry of a valid user identification and password combination, a main menu is displayed to the user. The main menu displays the remaining option choices shown in FIG. 2. In a preferred embodiment of the present invention, the program that performs the method of the present invention allows the user to quit the program by logging off in a conventional manner.

An "exit to DOS" option shown at step 26 allows the user to exit the program that performs the method of the present invention and return to the operating system of the hand-held computer 10. The step 26 "exit to DOS" option allows the user to perform data manipulation functions using the operating system functions of the hand-held computer 10. The "exit to DOS" option shown at step 26 is fully explained below with reference to FIG. 3.

A system setup option shown at step 28 allows the user of the hand-held computer 10 to define system parameters based on specific requirements. The step 28 system setup option is fully explained below with reference to FIG. 4.

A purchase order information option shown at step 30 allows a user to enter purchase order information into the hand-held computer 10. The step 30 purchase order information option is fully explained below with reference to FIG. 5.

A pipe labeling option shown at step 32 allows the user to enter data for specific pipe joints into the hand-held computer 10 and to generate individual bar code labels for pipe joints using the bar code label printer 14. The step 32 pipe labeling option is fully explained below with reference to FIG. 6.

A pipe shipping option shown at step 34 allows the user to enter shipping and other transportation information into the hand-held computer 10 using the bar code scanner 18. The user may also generate a comprehensive shipping label bar code and/or a shipping tally report using the pipe shipping option. The step 34 pipe shipping option is fully explained below with reference to FIG. 7.

A pipe receiving option shown at step 36 allows the user to generate a report containing information relating a shipment of received pipe joints by scanning the comprehensive shipping label bar code generated at step 34 by the pipe shipping option with the bar code scanner 18. The received pipe joint information report may also be generated by scanning the individual bar code labels affixed to each received pipe joint in a shipment with the bar code scanner 18. The step 36 pipe receiving option is fully explained below with reference to FIG. 8.

A reports option shown at step 38 allows the user to generate a variety of pipe joint information reports from information stored in the hand-held computer 10 and print the results on the report printer 16. The step 38 reports option is fully explained below with reference to FIG. 9.

A miscellaneous operations option shown at step 40 allows the user to perform a variety of miscellaneous operations such as reprinting duplicate pipe labels. The step 40 miscellaneous operations option is fully explained below with reference to FIG. 10.

A pipeline tracking option shown at step 41 allows the user to create a record of the location of specific pipe joints in a pipeline. The manufacturing and transportation data recorded on the bar code label affixed to the pipe may be identified for each specific pipe joint in the pipeline. The step 41 pipeline tracking option is fully explained below with reference to FIG. 11.

Figure 3:
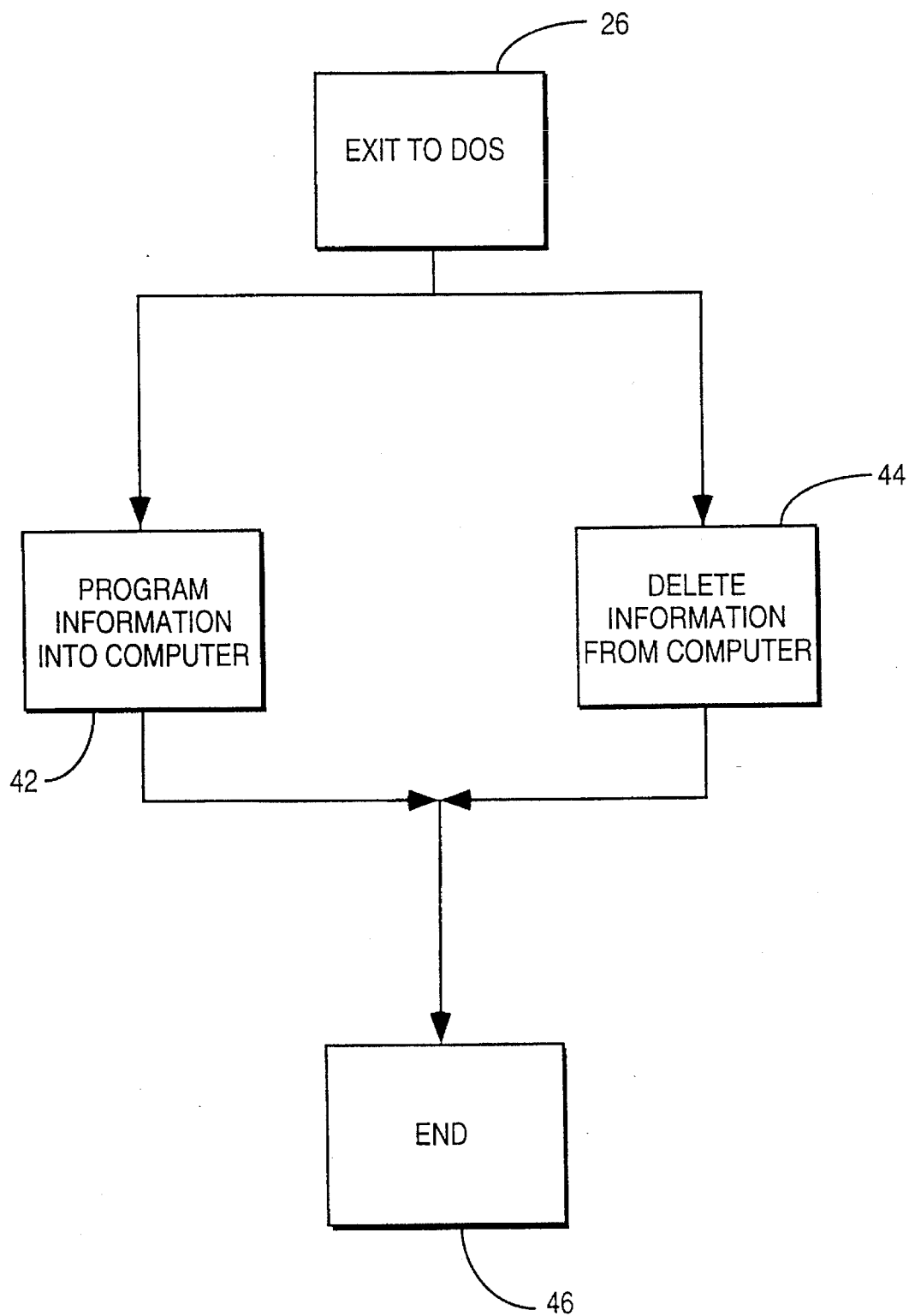
FIG. 3 is a flow diagram showing the operations associated with the "exit to DOS" option of the present invention.

FIG. 3 is a flow diagram showing the operations associated with the step 26 "exit to DOS" option of the present invention. If the user selects the "exit to DOS" option from the main menu, he is given the choice of manually entering data into the hand-held computer 10 using operating system commands as indicated at step 42 or deleting information from the hand-held computer 10 as indicated by step 44. When the user completes operating system functions at step 46, program control is returned to the main menu or any other menu shown in FIG. 2.

Figure 4:
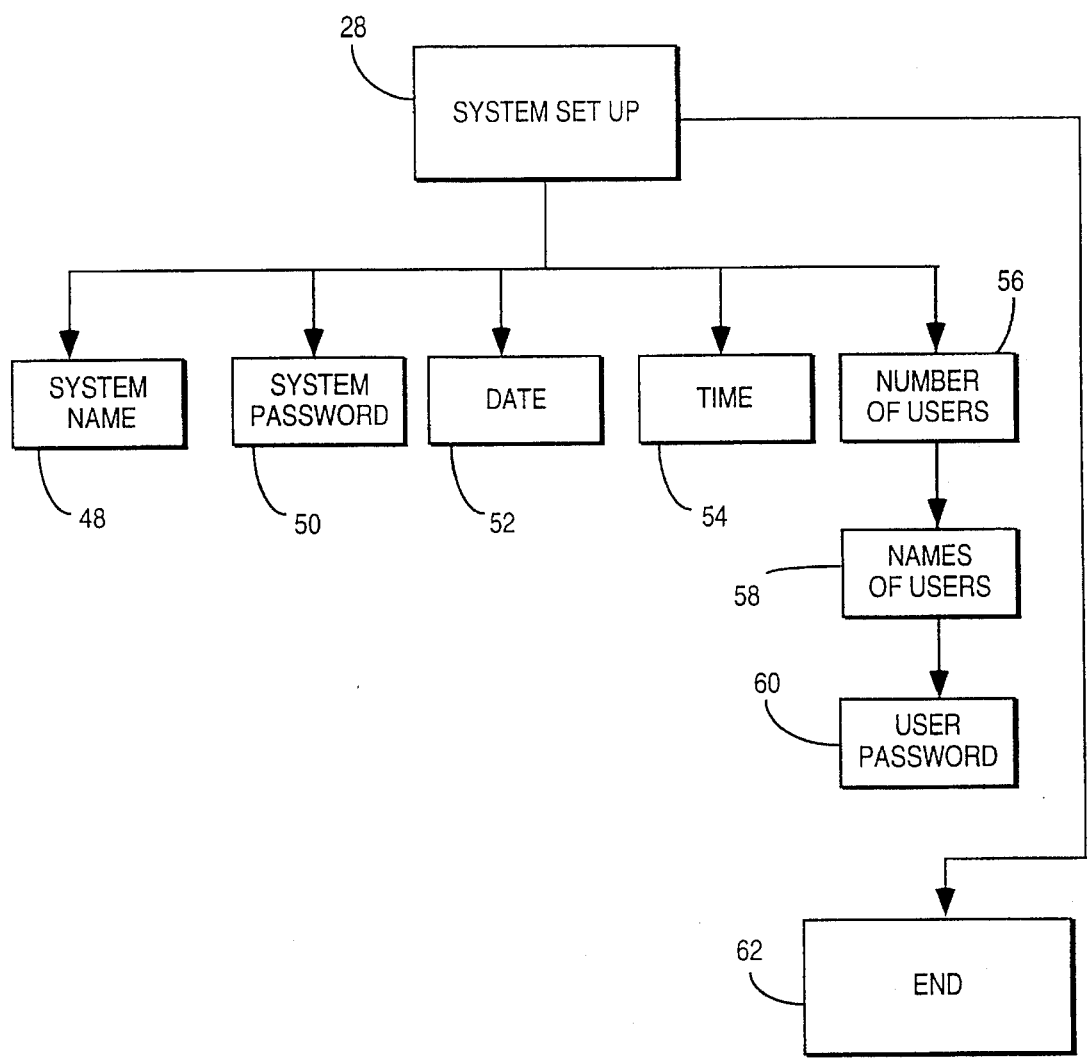
FIG. 4 is a flow diagram showing the operations associated with the system set-up option of the present invention.

FIG. 4 is a flow diagram showing the operations associated with the system set-up option 28 of the present invention. The system set-up option is typically accessed when the hand-held computer 10 is initially set up or when system parameters require alteration because of changed system conditions. In other words, accessing the system setup option 28 is an unusual event that is normally performed by a system administrator rather than a typical end user. At step 48, entry of a unique system name is required. Entry of a unique system password is required at step 50. The system name and password must be entered before system parameters may be altered.

Alteration of the system name and password are not part of the method of the present invention. Moreover, the development of software to allow alteration of the system name and password is within the ability of one of ordinary skill in the field.

After the correct system name and password have been entered, the system date (step 52) or the system time (step 54) may be changed. The number of system users may be modified as shown at step 56. After the number of users is defined, individual user names may be changed as shown at step 58. Similarly, individual user passwords may be changed as shown at step 60. Upon completion of the system setup option 28, as shown at step 62, program control is returned to the main menu or any other menu shown in FIG. 2.

Figure 5:
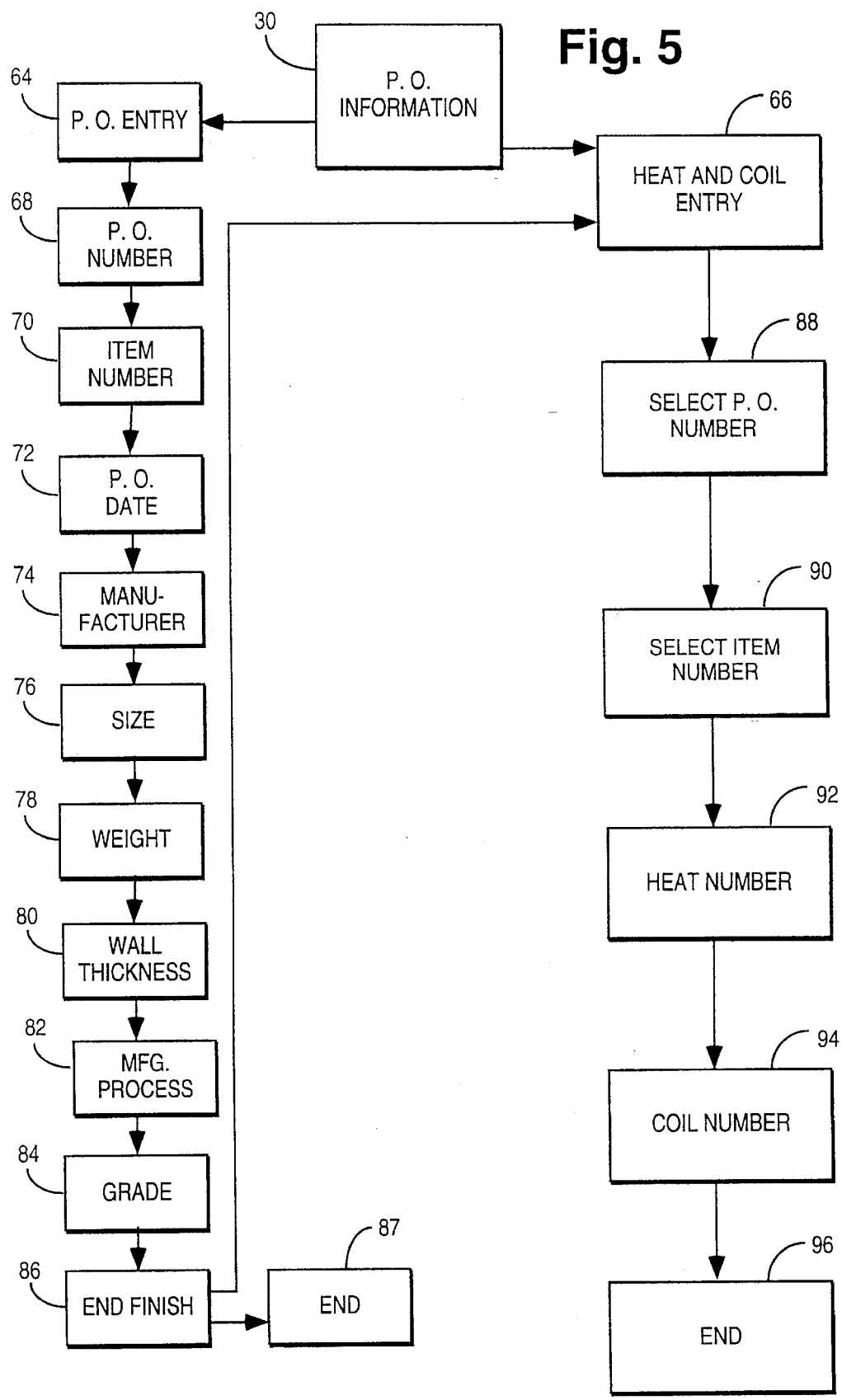
FIG. 5 is a flow diagram showing the operations associated with the purchase order information option of the present invention.

FIG. 5 is a flow diagram showing the operations associated with the purchase order information option 30 of the present invention. The purchase order information option 30 allows the user to perform two functions related to purchase orders. The first allows the entry of purchase order information for pipe joints that will be manufactured, labeled and shipped, as indicated at step 64. As will be explained, the user defines the purchase order number, the size, the weight and thickness of the pipe joints ordered. Purchase order information is required to generate individual pipe bar code labels using the pipe labelling option 32.

The second function is the entry of heat and coil information, as shown at step 66. Heat and coil information are unique identifiers given to the heat and coil of steel used to manufacture the pipe for the purchase order. Heat and coil information is also required for the generation of pipe joint bar code labels using the pipe labelling option 32. Purchase order information must be entered into the hand-held computer 10 before heat and coil information is entered. When performing the pipe labelling option 32, purchase order information is used to ensure that duplicate pipe joint bar code labels are not accidentally generated by the user.

When entering purchase order information (step 64), the user must define a purchase order number 68, an item number 70, a purchase order date 72, a manufacturer 74, a size 76, a weight 78, a wall thickness 80, a manufacturing process 82, a grade 84 and an end finish 86.

When the user has completed the entry of purchase order information, he may proceed directly to the entry of heat and coil information 66. Alternatively, the user may exit the purchase order information option 30 as shown at step 87 and enter the heat and coil information for the purchase order at a later time. If the user exits the purchase order information option 30 as indicated at step 87, program control is returned to the main menu or any other menu shown in FIG. 2.

When performing the entry of heat and coil information at step 66, the user is required to select a purchase order number at step 88 and to select an item number at step 90. A purchase order may contain a variety of item numbers. Item numbers typically correspond to different sizes of pipe. Different sizes of pipe joints may be ordered using different item numbers on the same purchase order. Next, the heat number 92 and coil number 94 are entered for each item number. Each line item of a purchase order may call for pipe joints that are made from more than one heat and coil. The hand-held computer 10 allows entry of any number of heat and coil entries for each purchase order line item.

When the purchase order information option 30 is initiated, the user is prompted for a purchase order entry and a purchase order number. When this information is entered, the program executing the method of the present invention determines whether the purchase order is new or whether information has previously been entered for it. If the purchase order is new, the hand-held computer 10 prompts for the purchase order date and the manufacturer. If the purchase order has previously been entered, the hand-held computer 10 re-displays the values that were previously entered. When the user has finished entering purchase order information as shown at step 96, program control may return to the main menu or any other menu shown in FIG. 2.

Figure 6:
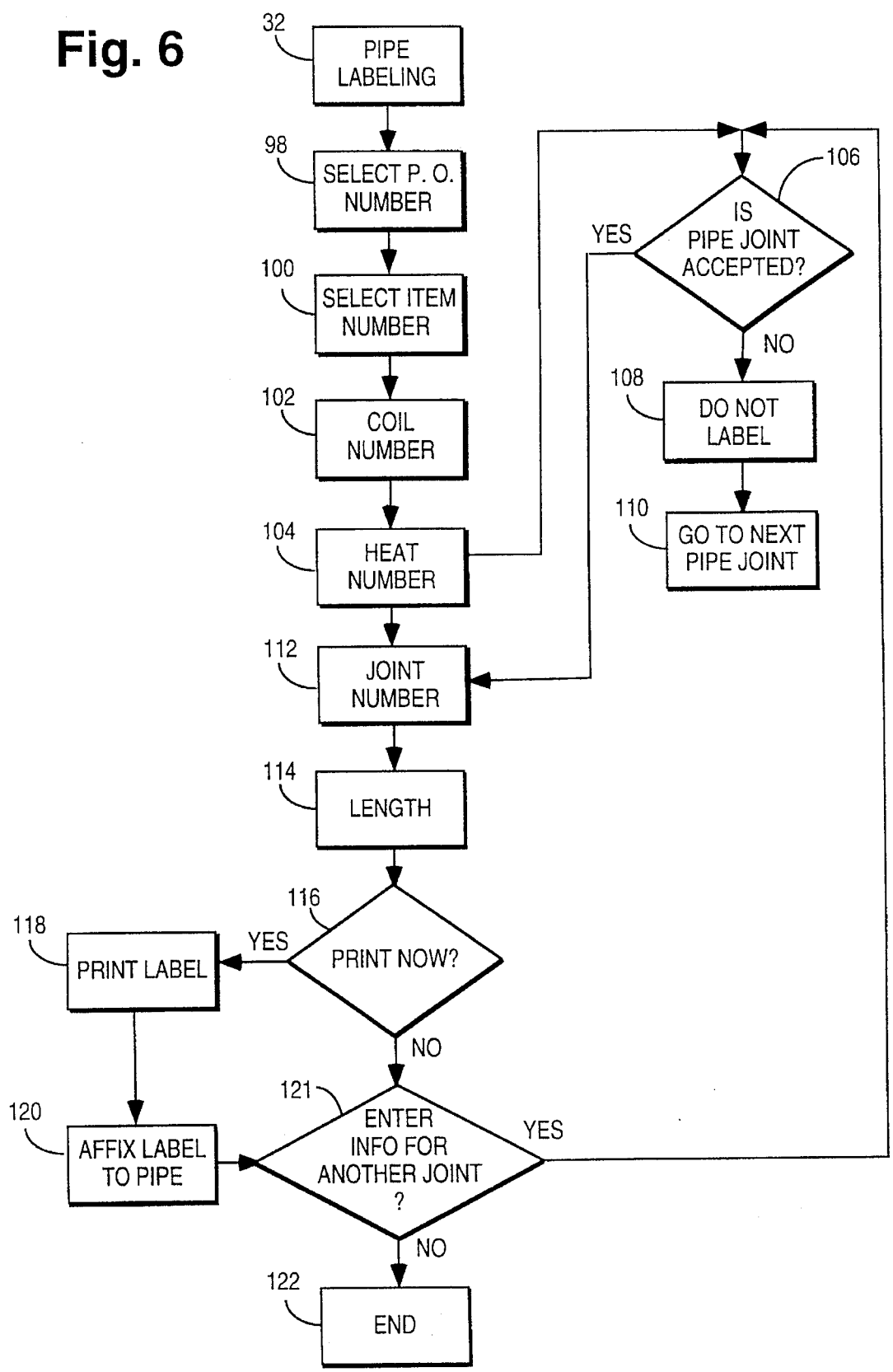
FIG. 6 is a flow diagram showing the operations associated with the pipe labeling option of the present invention.

FIG. 6 is a flow diagram showing the operations associated with the pipe labeling option 32 of the present invention. The pipe labeling option 32 allows the user to enter information about pipe joints that were manufactured and accepted for shipment. The pipe labelling option 32 cannot be used until purchase ordering information has been entered into the hand-held computer 10.

When the pipe labelling option 32 is initiated, the user is prompted for a purchase order number as shown at step 98 and item number as shown at step 100. The purchase order number and item number must match information previously entered into the hand-held computer 10. Once the purchase order number and item number have been properly selected, the user is prompted for information identifying each pipe joint accepted for shipment. If previous pipe joints have been entered using the pipe labelling option 32, the user is prompted to enter additional pipe joints. Thus, the user may enter information for several pipe joints then perform other functions before returning to the pipe labelling option 32 to complete entry of information for a specific purchase order and item number.

To uniquely identify a pipe joint, the user must enter a coil number as shown at step 102, which is automatically associated with a specific heat number (step 104) entered during the purchase order information option 30. The coil number and heat numbers must match coil and heat numbers previously entered for the purchase order using the purchase order information option 30. In a preferred embodiment of the invention, the coil number defaults to the previously-entered coil number because the coil number changes infrequently. The default coil number is edited when it does change.

After the coil number and heat number have been properly identified, the user decides whether the pipe joint is accepted for shipment as shown in step 106. This determination is made based on whether the joint meets the standards to which it was manufactured. If the pipe joint is not accepted, it is not labelled (step 108). Accordingly, the user proceeds to the next pipe joint to determine whether it is accepted as shown at step 110.

If the joint is accepted for shipment, the user inputs a unique joint number as shown at step 112 and the length of the joint as shown in step 114. In a preferred embodiment, duplicate joint numbers are not permitted. Also in a preferred embodiment, a program embodying the method of the present invention allows the user to edit the joint length at any time. This feature is desirable because pipe joints are sometimes divided into smaller units for installation in a pipeline or well bore. If a joint is so divided, additional labels may be generated by creating duplicate records, editing the length for each smaller section and printing additional labels. Thus, if a single joint is divided into three smaller sections for installation, three separate labels may be generated, each indicating the correct length for the associated joint section with all other information on the label remaining the same for each of the three smaller sections.

The history of the present invention may also include manufacturing specifications, as previously noted. These specifications include the results of tests performed on pipe joints during manufacture. Thus, the history of the present invention allows future identification of tests performed on individual pipe joints.

Next, the user has the option of printing the bar code label for the pipe joint as shown at step 116 or continuing to enter information for other pipe joints. If the user desires to print the bar code label, it is printed as shown at step 118 using the bar code label printer 14. Subsequently, the bar code label is affixed to the pipe as shown at step 120. If the user desires to continue entering information for additional pipe joints as shown at step 121, program execution returns to step 106. In a preferred embodiment of the present invention, bar code labels based on information entered in the pipe labelling option 32 at a later time using the reports option 38. When the user exits the pipe labelling option 32 as shown at step 122, program control may return to the main menu or any other menu shown in FIG. 2.

The pipe labelling option 32 of the present invention greatly improves record keeping ability. Dam is entered and maintained in the hand-held computer 10 for each specific pipe joint that is accepted for shipment. This data may be edited if errors are made. Unique bar code labels are generated for each pipe joint and labels containing identical information are prohibited with the exception that the user is given the option to print a duplicate pipe label if the original label is lost or damaged. Thus, each pipe joint accepted for shipment is uniquely identified by its own bar code label.

Figure 7:
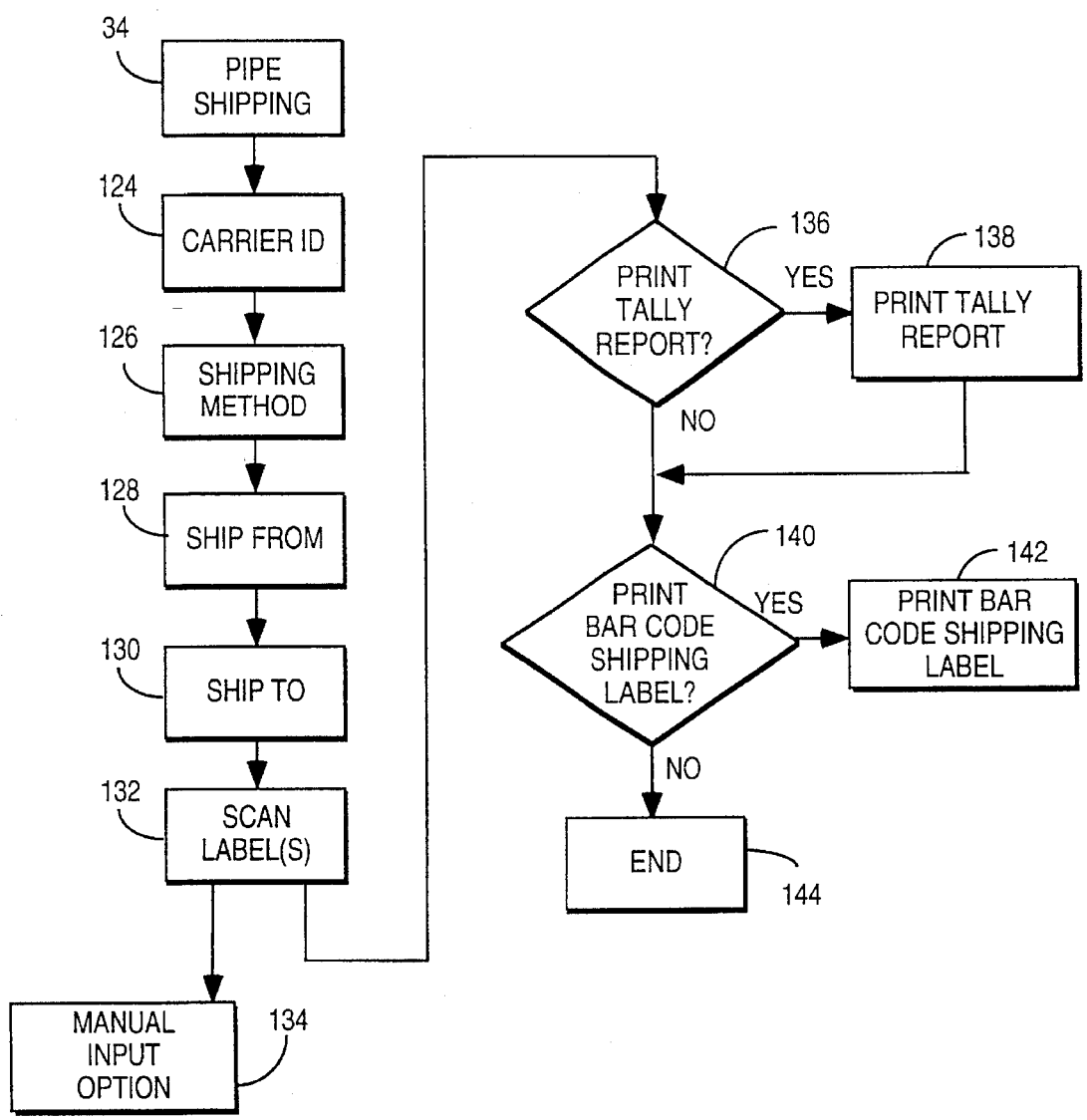
FIG. 7 is a flow diagram showing the operations associated with the pipe shipping option of the present invention.

FIG. 7 is a flow diagram showing the operations associated with the pipe shipping option 34 of the present invention. The pipe shipping option 34 allows a user to enter the number of pipe joints that are being loaded onto a truck, rail car, barge, ship or any other mode of transportation. When the pipe shipping option 34 is initiated, the user must enter a carrier identification as shown at step 124 and a shipping method as shown at step 126. The user must also enter a "ship from" location as shown at step 128 and a "ship to" location as shown at step 130.

The carrier identification is used to uniquely identify each shipping transaction. Specifically, the carrier identification uniquely identifies the mode of transportation being loaded for shipment. In a preferred embodiment of the invention, the carrier identification is checked to determine whether shipping information is being entered for the first time or whether additional shipping information is being entered for a previously-entered carrier identification. If the shipping information being entered is not for a new carrier identification, the user is not required to enter the shipping method, "ship from" location or "ship to" location.

Next, the user scans the individual bar code labels for each pipe that is to be shipped using the bar code scanner 18 as shown at step 132. If a bar code label for a pipe joint cannot be located or for some reason cannot be scanned with the bar code scanner 18, information for the corresponding pipe joint may be manually entered into the hand-held computer 10 as shown at step 134. If pipe joint information must be manually entered, the joint number and its length must be known. Additionally, a bar code label corresponding to a pipe joint manufactured for the same purchase order number and item number must be available to be scanned. The joint number and coil number are manually entered and the remaining information for the missing entry is entered into the hand-held computer 10 by scanning the label of the pipe joint that was manufactured for the same purchase order number and item number.

In a preferred embodiment of the invention, an error will be indicated if a label is accidentally scanned more than once or if duplicate labels are scanned for a given shipment of pipe joints. The program performing the method of the present invention maintains a running total of the number of pipe joints scanned.

If the shipping method is by truck, a running total of all pipe joints to be shipped is maintained. An indication is given by the hand-held computer 10 when the total weight of pipe joints to be shipped exceeds a predetermined weight (for example, 45,000 pounds). A preferred embodiment of the present invention also gives the user an opportunity to enter any remarks pertinent to the specific shipment being entered.

After all bar code labels for pipe joints to be shipped have been scanned, the user has the option to print a shipping tally report using the report printer 16 as shown at step 136. If the user elects to print the shipping tally report, the report is printed as shown at step 138. A preferred embodiment of the shipping tally report includes all information that has been entered into the hand-held computer 10 that is pertinent to the particular purchase order. The shipping tally report also preferably includes a total count of pipe joints shipped, a total weight of all pipe joints shipped and a total length of all pipe joints shipped. Those of ordinary skill in the field will recognize, however, that the shipping tally report may contain any desired subset of the purchase order information. The organization and layout of the shipping tally report is not an essential feature of the invention.

The user also has the opportunity to print a bar code shipping label as shown at step 140. If the user desires to print the bar code shipping label, the label is printed using the bar code label printer 14 as shown at step 142. In a preferred embodiment of the invention, a separate bar code shipping label is generated for each purchase order item to be shipped. The bar code shipping label contains a simplified manifest of the purchase items that are to be shipped. The specific items recorded in the bar code shipping label are not an essential feature. Moreover, those of ordinary skill in the field will recognize that any suitable combination of items may be selected to be recorded in the bar code shipping label. When the pipe shipping option 34 has been completed as shown at step 144 program control may return to the main menu or any other menu shown in FIG. 2.

Figure 8:
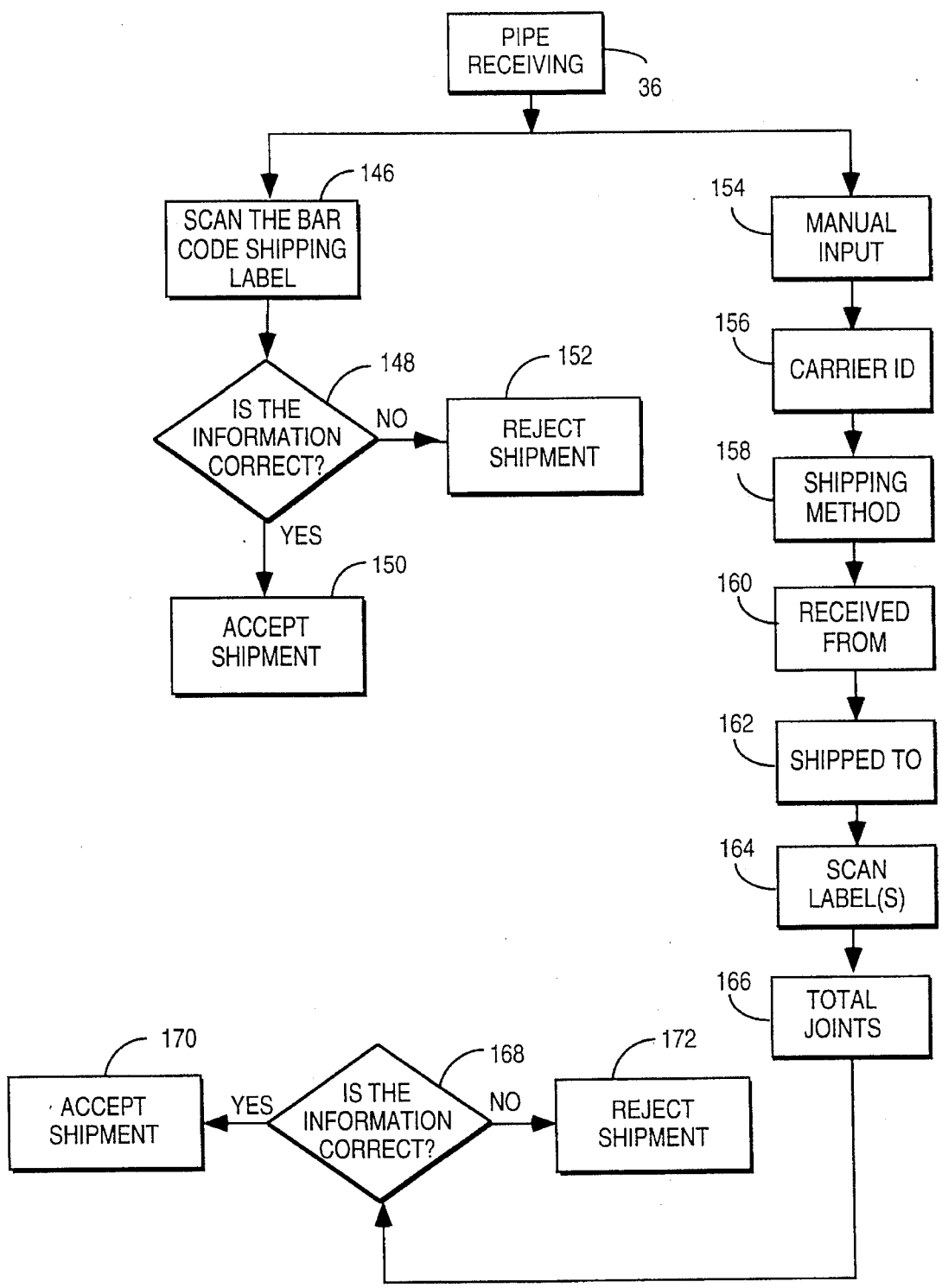
FIG. 8 is a flow diagram showing the operations associated with the pipe receiving option of the present invention.

FIG. 8 is a flow diagram showing the operations associated with the pipe receiving option 36 of the present invention. The pipe receiving option 36 allows the user to enter information about pipe joints that are received into the hand-held computer 10. If a shipment of pipe joints is accompanied by a bar code shipping label produced using the pipe shipping option 34, receiving information is entered into the hand-held computer 10 by scanning the bar code shipping label with the bar code scanner 18 as shown at step 146. The user compares the information from the bar code shipping label with what was actually ordered on the associated purchase order as shown at step 148. If the information on the bar code shipping label corresponds to the pipe joints that were ordered, the shipment is accepted as shown at step 150. If the information from the bar code shipping label does not correspond to the pipe joints that were actually ordered, the shipment is rejected as shown at step 152.

The ability to enter all receiving information by scanning the bar code shipping label greatly reduces the amount of time required to determine whether a shipment of pipe joints should be accepted. Additionally, information read from the bar code shipping label is not subject to human error. Accordingly, the method of the present invention results in significant cost savings and is more accurate than prior art methods.

If no bar code shipping label is provided with the shipment, information is manually entered into the hand-held computer 10 as shown at step 154. A carrier identification, shipping method, "received from" location and "shipped to" location are manually entered into the hand-held computer 10 as shown at steps 156, 158, 160 and 162 respectively. Next, the individual bar code labels affixed to each pipe joint in the shipment are scanned as shown at step 164. The total number of joints is determined as shown at step 166. The receiving information is then compared to the actual purchase order information as shown at step 168. If the receiving information is correct, the shipment is accepted as shown at step 170. The shipment is rejected as shown in step 172 if the receiving information does not match what was actually ordered.

In the pipe receiving option 36, the user has the option to print a receiving tally report based on the information entered into the hand-held computer 10 either by scanning the bar code shipping label or by scanning the bar code label affixed to each individual pipe joint received. This report is useful in identifying pipe joints that were either not included in the shipment or included erroneously.

Figure 9:
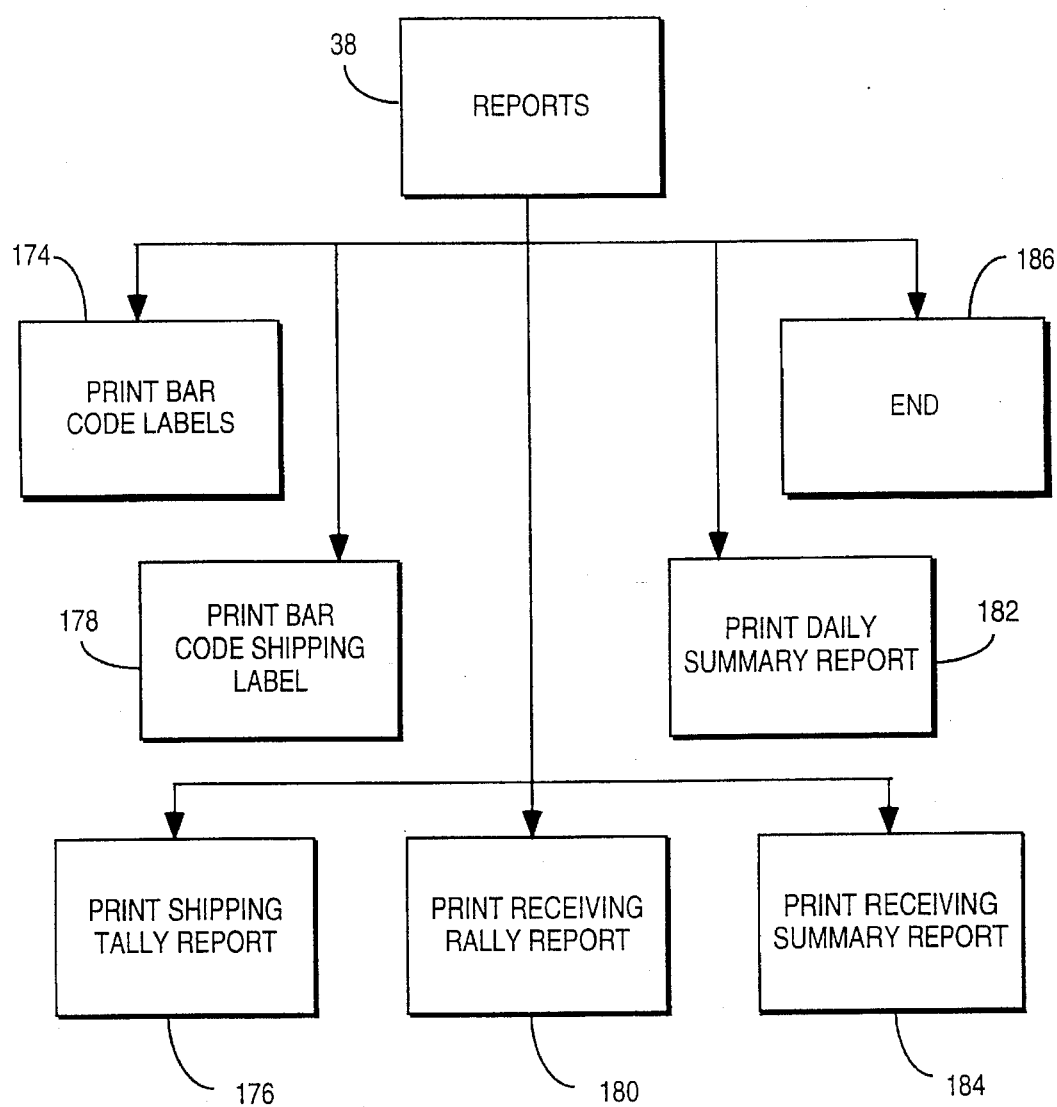
FIG. 9 is a flow diagram showing the operations associated with the reports option of the present invention.

FIG. 9 is a flow diagram showing the operations associated with the reports option 38 of the present invention. The reports option 38 allows the user to print or reprint bar code labels for individual pipe joints as shown at step 174. These labels are printed based on information entered into the hand-held computer 10 using the pipe labelling option 32.

The reports option 38 also allows the user to print a shipping tally report and a bar code shipping label as shown respectively at steps 176 and 178. The shipping tally report and bar code shipping label are created based on information entered into the hand-held computer 10 using the pipe shipping option 34.

As shown at step 180, the reports option 38 allows the user to print a receiving tally report. The receiving tally report is created based on information entered into the hand-held computer 10 using the pipe receiving option 36.

The reports option 38 further allows the user to print a daily summary report as shown at step 182. The daily summary report gives information about pipe joints that have been manufactured or labelled on a given day. In a preferred embodiment, the user selects the option of printing the daily summary report and identifies a purchase order number and item number. The daily summary report preferably includes the heat number, coil number, joint number, joint length and joint weight. The daily summary report is preferably sorted by labelled date, heat number, coil number and joint number.

Finally, the reports option 38 allows the user to print a receiving summary report as shown at step 184. The user selects the receiving summary report option and identifies a purchase order number and item number. The receiving summary report preferably includes the carrier, the total number of joints shipped by that carrier and the total length and weight of pipe joints shipped by that carrier for each carrier that shipped pipe joints for the identified purchase order number and item number. When the user desires to terminate the reports option 38 as shown at step 186, program control may return to the main menu or any other menu shown in FIG. 2.

Figure 10:
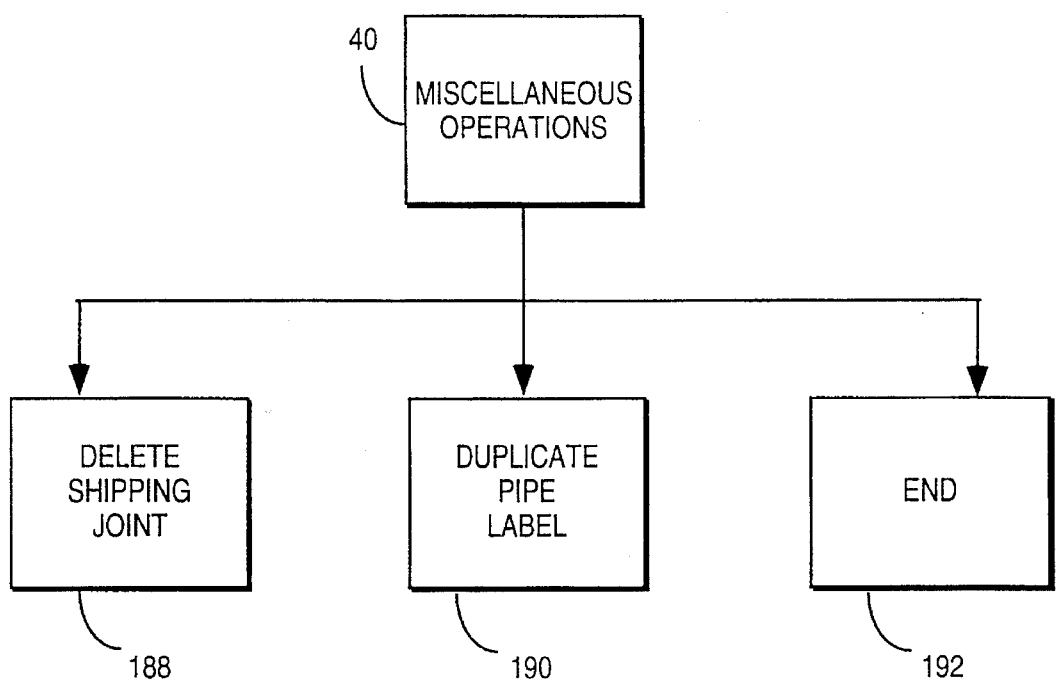
FIG. 10 is a flow diagram showing the operations associated with the miscellaneous operations option of the present invention.

FIG. 10 is a flow diagram showing the operations associated with the miscellaneous operations option 40 of the present invention. The miscellaneous operations option 40 allows the user to perform special functions that do not normally occur during the pipe labeling, shipping and receiving process.

As shown at step 188, the miscellaneous operations option 40 allows the user to delete pipe joint information that was scanned into the hand-held computer 10 using the pipe shipping option 34. If the bar code label for a pipe joint is scanned into the hand-held computer 10 and the pipe joint is not actually loaded onto the carrier or the joint is removed because of damage during loading or other reasons, the information about the pipe joint that was not loaded or was removed must be deleted from the hand-held computer 10 to ensure accuracy of the bar code shipping label and the shipping tally report.

The miscellaneous operations option 40 also allows the user to create duplicate pipe labels as shown at step 190. This feature may be used to create a duplicate pipe joint bar code label by scanning the existing label with the bar code scanner 18. Also, the duplicate pipe label feature allows the user to create a missing label by scanning a similar bar code label with the bar code scanner 18 and editing information such as the joint number and length before printing the new bar code label. No other information must be present in the hand-held computer 10 to use the duplicate pipe label function. When the user desires to terminate the miscellaneous operations option 40 as shown at step 192, program control may return to the main menu or any other menu shown in FIG. 2.

Figure 11:
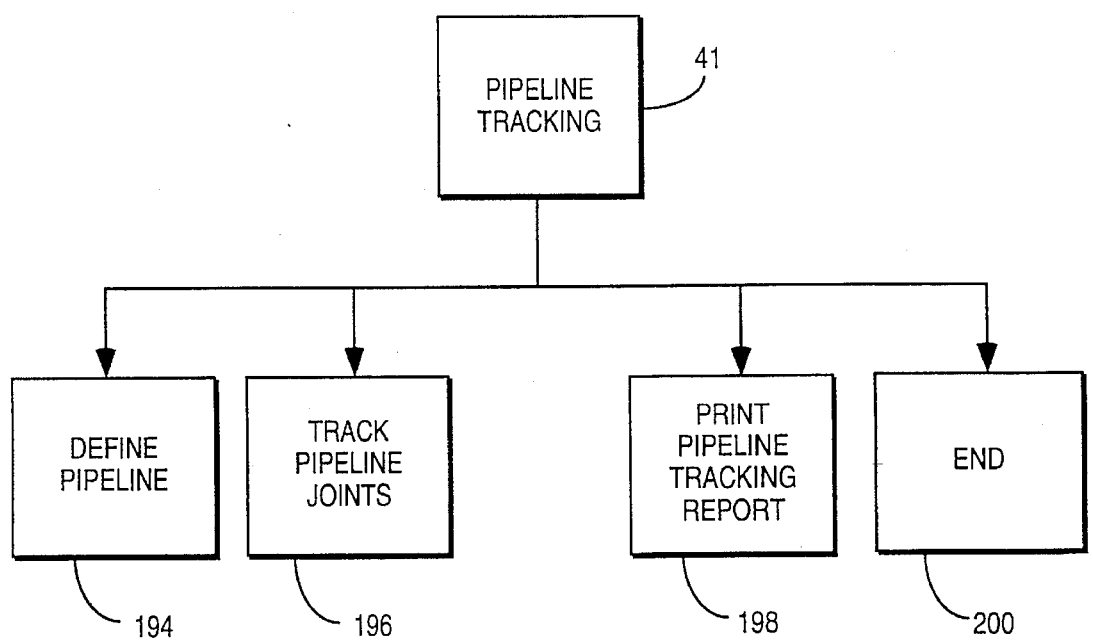
FIG. 11 is a flow diagram showing the operations associated with the pipeline tracking option of the present invention.

FIG. 11 is a flow diagram showing the operations associated with the pipeline tracking option 41 of the present invention. The pipeline tracking option is an extremely important aspect of the present invention because it allows accurate identification of pipe joints after they have been installed in a pipeline or well bore based on information entered into the hand-held computer 10 during the various stages of manufacture and transportation.

When a pipe joint is installed in a pipeline or well bore, information previously entered into the hand-held computer 10 is maintained as a record and the bar code associated with that pipe joint is removed. Creation of a permanent record and removal of the bar code from the inside of pipe joints allows the important advantages over known bar code tracking systems. Removal of the bar code prevents subsequent valve jams and other similar problems that occur over time when bar codes become dislodged because of fluid flow in the pipeline. The permanent record created in the hand-held computer 10 is used to specifically identify individual pipe joints in a completed pipeline or well bore. The permanent record can be used to identify the manufacturer of specific pipe joints in the pipeline or well bore in the event of catastrophic failure of one of the pipe joints so that the legal liability of the owner of the pipeline or well bore may be shared with the manufacturer of the pipe joint that failed. Additionally, other pipe joints having similar manufacturing characteristics may be identified and examined to ensure that other catastrophic failures do not occur.

The pipeline or well bore tracking option 41 allows the user to define a pipeline or well bore as shown in step 194. To identify a pipeline or well bore, the user is required to enter a pipeline or well bore name and an appropriation or project number. After this information is entered into the hand-held computer 10, the user is allowed to enter information to track individual pipeline or well bore joints as shown at step 196. The user may enter specific pipe joint information either manually or by scanning the bar code label associated with a particular pipe joint. The user also enters the specific location in the pipeline or well bore that the pipe joint occupies based on its physical location (for example, the latitudinal and longitudinal or vertical coordinates of the pipe joint) or its location in terms of how many joints it is removed from a specific point in the pipeline or well bore.

Finally, the user is allowed to print a pipeline tracking report as shown in step 198. The pipeline tracking report includes information sufficient to identify each individual pipe joint based on its location in the pipeline or well bore. Thus, the pipeline tracking report allows identification of specific pipe joints based on relevant manufacturing and transportation characteristics as recorded using the purchase order information option 30, the pipe labelling option 32, the pipe shipping option 34 and the pipe receiving option 36 of the present invention. When the user desires to terminate the pipeline tracking option 41 as shown at step 200, program control may return to the main menu or any other menu shown in FIG. 2.

The method of the present invention has numerous other uses as well. For example, the historical record of information that results from the method of the invention may be analyzed to predict catastrophic failures of pipe joints. If a pipe joint fails, the historical record may be evaluated to determine the location of other pipe joints having similar characteristics. When these pipe joints have been identified, they may be subjected to examination and testing to determine whether they should be replaced.

The record of information created by the method of the present invention may additionally be used to identify inconsistencies in the manufacturing processes used by producers of steel pipe. Pipe joint numbers are typically assigned sequentially based on the relative position of the joint within the associated coil during manufacture. Inconsistencies in the manufacturing process usually cause joints in similar relative positions in different coils to have similar characteristics. For example, if joint number seven in a first coil is defective, it would not be unusual for the joint in the same position in a different coil made with the same process to be similarly defective. The historical record created by the method of the present invention may be analyzed to identify the existence of these types of manufacturing process inconsistencies. This information is useful for assisting producers of steel pipe joints in improving their manufacturing processes.

Thus, there has been described herein a method of creating a comprehensive manufacturing, shipping and location history for pipe joints. It will be understood that various changes in the details and arrangements of the implementation described herein will occur to those skilled in the art without departing from the principle and scope of the present invention. While the invention has been described with reference to the presently contemplated best mode for its practice, it is intended that this invention only be limited by the scope of the appended claims.

What is claimed is:

1. A method for creating an historical record for a plurality of pipes joints by use of a bar code reader coupled to a computer, said historical record comprising an information record for each one of said plurality of pipe joints, each of said information records having at least two portions, a first portion of each of said information records comprising selected physical characteristics of one of said plurality of pipe joints and a second portion of each of said information records comprising an exact location of one of said plurality of pipe joiners in a pipeline, said method comprising the steps of:

(a) recording a heat number associated with one of said plurality of pipe joints;

(b) recording a coil number associated with one of said plurality of pipe joints;

(c) recording a joint number associated with one of said plurality of pipe joints;

(d) creating a bar code label containing at least said heat number, said coil number and said joint number for one of said plurality of pipe joints;

(e) attaching said bar code label to the corresponding one of said plurality of pipe joints;

(f) repeating steps (a) through (e) for each of said plurality of pipe joints;

(g) transporting each one of said plurality of pipe joints to a final destination in pipeline having a corresponding exact location address;

(h) scanning each one of said bar code labels with said bar code reader to compile said heat number, said coil number, and said joint number to form said first portion of said information on record for each corresponding one of said plurality of pipe joint;

(i) storing said first portion of said information record for each one of said plurality of pipe joints in a memory of said computer;

(j) permanently removing each one of said bar code labels from the corresponding one of said plurality of pipe joints;

(k) inputting into said computer said exact location address in said pipeline for each one of said plurality of pipe joints to form said second portion of said information record for each corresponding one of said plurality of pipe joints; and (l) storing said second portion of said information record for each on of said plurality of pipes joints in a memory of said computer.

2. A method of creating an historical record for a plurality of pipe joints by use of a bar code reader coupled to a computer said historical record comprising an information record for each one of said plurality of pipe joints, each of said information records having at least two portions, a first portion of each of said information records comprising selected physical characteristics of one of said plurality of pipe joints and a second portion of each of said information records comprising an exact location of one of said plurality of pipe joints in a pipeline, said historical record being used to identify and locate each one of said plurality of pipe joints that is likely to fail by detecting a correspondence of portions of said information record between a failed pipe joint the remaining one of said plurality of pipe joints, said method comprising the steps of:

(a) recording a heat number associated with one of said plurality of pipe joints;

(b) recording a coil number associated with one of said plurality of pipe joints;

(c) recording a joint number associated with one of said plurality of pipe joints;

(d) creating a bar code label containing said heat number, said coil number, and said joint number for one of said plurality of pipe joints;

(e) attaching said bar code label to the corresponding one of said plurality of pipe joints;

(f) repeating steps (a) through (e) for each of said plurality of pipe joints;

(g) transporting each one of said plurality of pipe joints to a final destination in said pipeline having a corresponding exact location address;

(h) scanning each of said bar code labels with said bar code reader to compile said heat number, said coil number, and said joint number to form said first portion of said information record for each corresponding one of said plurality of pipe joints;

(i) storing said first portion of said information record for each one of said plurality of pipe joints in a memory of said computer;

(j) permanently removing each of said bar code labels from the corresponding one of said plurality of pipe joints;

(k) inputting into said computer said exact location address in said pipeline of each one of said plurality of pipe joints to form said second portion of said information record for each corresponding one of said plurality of pipe joints;

(l) storing said second portion of said information record for each one of said plurality of pipe joints in a memory of said computer;

(m) identifying said exact location address of a failed pipe joint from said plurality of pipe joints;

(n) identifying said information record of said failed pipe joint based upon said exact location address of said failed pipe joint;

(o) comparing a portion of said information record of said failed pipe joint with a portion of said information records of the remaining ones of said plurality of pipe joints to find a correspondence between said portions of said information records;

(p) identifying from said correspondence between said portions of said information records which of the remaining ones of said pipe joints are likely to fail; and (g) locating each of said remaining ones of said pipe joints which are likely to fail based on said second portion of said information records of said pipe joints which are likely to fail.

3. The method recited in claim 2, wherein each one of said information records has at least a third portion comprising an identification of a manufacturer associated with a corresponding one of said plurality of pipe joints.

* * * * *

UNITED STATES PATENT AND TRADEMARK OFFICE
CERTIFICATE OF CORRECTION

PATENT NO.: 5,491,637
DATED: February 13, 1996
INVENTOR(S): Mark S. Kraemer, James A. Ratliff It is certified that error appears in the above-identified patent and that said Letters Patent is hereby corrected as shown below:

| Col. | Line | |
|---|---|---|
| 11 | 64 | "removal of the bar cede" should read --removal of the bar code-- |
| 13 | 44 | "one of said plurality of pipe joint;" should read --one of said plurality of pipe joints;-- |
| 13 | 58 | "for each on of said plurality of pipes joints" should read --for each one of said plurality of pipe joints-- |
| 14 | 5-6 | "a failed pipe joint the remaining one of said plurality of pipe joints," should read --a failed pipe joint and the remaining ones of said plurality of pipe joints,-- |

Signed and Sealed this

Twenty-eighth Day of May, 1996

Attest:

BRUCE LEHMAN

Attesting Officer     Commissioner of Patents and Trademarks